UNITED STATES PATENT OFFICE.

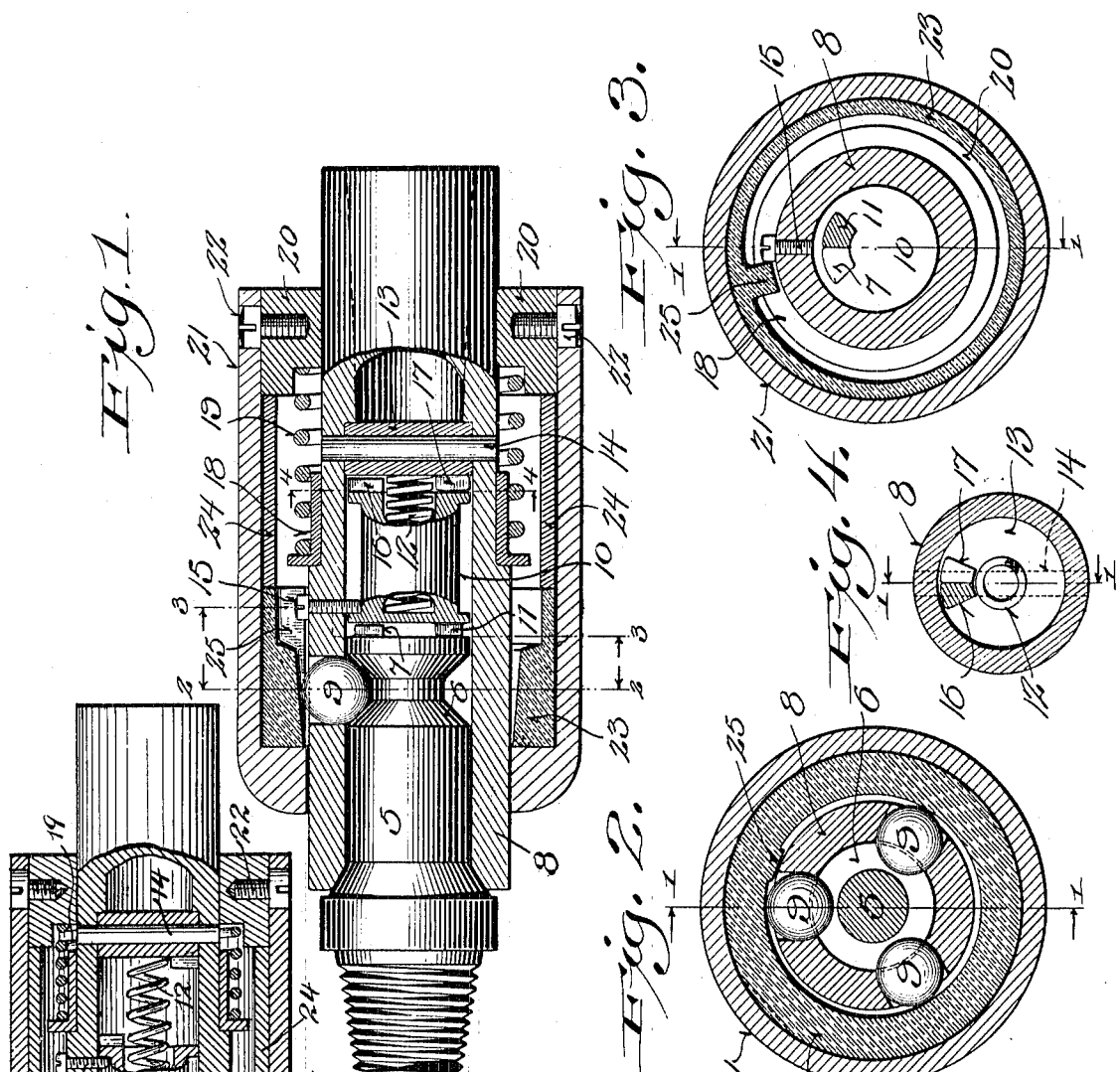

RAYMOND W. GRIFFITH AND ROBERT G. WENDLAND, OF MILWAUKEE, WISCONSIN; SAID WENDLAND ASSIGNOR TO SAID GRIFFITH.

CHUCK.

1,119,276. Specification of Letters Patent. Patented Dec. 1, 1914.

Application filed December 8, 1913. Serial No. 805,191.

*To all whom it may concern:*

Be it known that we, RAYMOND W. GRIFFITH and ROBERT G. WENDLAND, both citizens of the United States, and residents of Milwaukee, in the county of Milwaukee and State of Wisconsin, have invented certain new and useful Improvements in Chucks; and we do hereby declare that the following is a full, clear, and exact description thereof.

Our invention consists in what is herein particularly set forth with reference to the accompanying drawings and pointed out in the claims of this specification, its object being to provide simple, economical and efficient chucks for detachably connecting grinding and buffing wheels, drills and other tools with rotary driving spindles, the tool-carrying arbors or tools themselves being readily removable from the chucks without stopping the spindles with which said chucks may be connected.

Figure 1 of the drawings represents a partly sectional view of a chuck in accordance with our invention engaged by a tool-arbor, the plane of the section being indicated by line 1—1 in the other illustrations; Figs. 2 and 3, cross-sections of the chuck on planes indicated by lines 2—2 and 3—3 in Fig. 1; Fig. 4, a similar view of a detail of said chuck on a plane indicated by line 4—4 in said Fig. 1, and Fig. 5, a sectional view of the chuck illustrating the flanged end of a spring-controlled barrel opposing balls of the device to hold said balls in an adjusted position.

Referring by numerals to the drawings, 5 indicates a taper screw stub-arbor for detachable engagement with a grinding or buffing wheel or other tool to be rotated. A cylindrical shank of the arbor is provided with an annular groove 6 having bevel sides, and a lug 7 extends from the inner end of said arbor. The shank of the arbor is slipped into a hollow cylindrical and outwardly shouldered core 8 that is taper-bored at one end to have wedging fit on a rotary driving-spindle, and there is a preferably conical fit of a shoulder of said shank in the mouth of the core. The core is provided circumferentially thereof with apertures constituting seats for balls 9 engageable with the groove 6 of the arbor to thereby latch said arbor to said core.

In sliding engagement with the core 8 is a barrel 10 having a head end thereof provided with a lug 11 with which to engage the arbor-lug 7. The other end of the barrel is open for the insertion of a spiral-spring 12, and this spring opposes a disk 13 detachably secured in the core 8 by a pin 14 or otherwise, as may be most convenient in practice, said spring being contracted when the shank of the arbor 5 is caught in said core. Play of the barrel longitudinally of the core is limited by an inwardly extending stop-screw 15 with which said core is provided between outer head-flanges of said barrel.

The barrel 10 and the opposing disk 13 in the core 8 are respectively provided with engaging lugs 16, 17, similar to those aforesaid, and a flanged collar 18 is slipped on said core against the outer shoulder thereof. Arranged on the collar against the flange thereof is a spring 19 that opposes a head 20 detachably secured in one end of a sleeve 21 by preferably countersunk screws 22, the head being loose on the core 8 and preferably recessed to receive the opposing end of said spring.

The forward end of the sleeve 21 is loose on the core 8, forward of the ball-seats therein, and contains a wedge-ring 23 for holding the balls 9 in engagement with the shank-groove of the aforesaid arbor, but there is ball-clearance space in the rear end of the wedge-ring. A spacing-ring 24 is also shown in the sleeve 21 between the head 20 and wedge-ring 23. Provided in the wedge-ring is a web 25 in the path of the stop-screw 15 of the core 8, whereby said ring is caused to rotate with said core, and the disposition of said web is such that there is play of the same between a pair of the balls aforesaid.

The above described parts being relatively positioned as shown in Fig. 1, and the core 8 wedged on a driving spindle, the lug 17 of the disk 13 will engage the lug 16 of the barrel 10 and coincidently there will be an engagement of the lug 11 of said barrel with the lug 7 of the arbor, whereby the rotary motion of said spindle is transmitted to said arbor.

To disengage the arbor from the chuck, the sleeve 21 of said chuck is shifted against resistance of the spring 19, and coincidently the ring 23 is retracted from wedging-contact with the balls 9, thus permitting the withdrawal of said arbor, which operation results in a retraction of said balls into clearance space with which said ring is provided. At the same time the previously contracted spring 12 expands to cause the barrel 10 to follow the arbor until stopped in position to have a flange thereof oppose and hold the balls 9 in their retracted position as stops against reverse movement of the aforesaid sleeve and wedge-ring therewith.

We claim:

1. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core, means by which an automatic engagement is had of the core and arbor; a spring-controlled sleeve slidable on the core, and a wedge-ring associated with the sleeve to bind and clear said balls that are opposed by said barrel when in retracted position to serve as stops against slide of said sleeve in one direction.

2. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core and provided with end lugs one of which is designed to engage a lug provided in the core and the other with a lug provided upon the inner end of the arbor, a spring-controlled sleeve slidable on the core, and a wedge-ring associated with the sleeve to bind and clear said balls that are opposed by said barrel when in retracted position to serve as stops against slide of said sleeve in one direction.

3. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core and provided with outer flanges, a stop extending inward from the core between the barrel-flanges, means by which an automatic engagement is had of the core and arbor; a spring-controlled sleeve sliable on the core, and a wedge-ring associated with the sleeve to bind and clear said balls that are opposed by a flange of said barrel when in retracted position to serve as stops against slide of said sleeve in one direction.

4. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core, means by which an automatic engagement is had of the core and arbor; a spring-controlled sleeve slidable on the core, a wedge-ring associated with the sleeve to bind and clear said balls that are opposed by said barrel when in retracted position to serve as stops against slide of said sleeve in one direction, an inner web of the wedge-ring between a pair of the balls, and a stop on the core in the rotary path of the web.

5. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core, means by which an automatic engagement is had of the core and arbor; a spring-controlled sleeve slidable on the core, a wedge-ring arranged in the sleeve to bind and clear said balls that are opposed by said barrel when in retracted position to serve as stops against slide of said sleeve in one direction, a head detachably secured in the sleeve, and a spacing-sleeve intermediate of said head and ring.

6. A chuck comprising a hollow core for rigid connection with a drive-spindle and provided with apertures circumferentially thereof, balls for which said apertures constitute seats, these balls being for engagement with an annular groove of an arbor to clutch said arbor in sliding engagement with the core; a spring-controlled barrel having limited slide play in the core, means by which an automatic engagement is had of the core and arbor; a flanged collar in slip-fit on the core upon which it is suitably stopped, a sleeve slidable on the core, a spiral-spring between the collar-flange and a head having detachable connection with the sleeve, and a wedge-ring associated with said sleeve to bind and clear said balls that are opposed by said barrel when in retracted position to serve as stops against slide of said sleeve in one direction.

7. A chuck comprising a hollow core for rigid connection with a drive-spindle and provided with apertures circumferentially thereof, balls for which said apertures constitute seats, these balls being for engagement with an annular groove of an arbor in sliding engagement with the core; a disk detachably secured in said core and having one side thereof provided with a lug, a barrel having limited slide play in the core and provided with end lugs for engagement with the disk-lug and a lug provided on the inner end of the arbor, a spiral-spring in the barrel between a head of the same and said disk, a spring-controlled sleeve slidable on the core, and a wedge-ring associated with the sleeve to bind and clear said balls that are opposed by said barrel when in retracted position to serve as stops against slide of said sleeve in one direction.

In testimony that we claim the foregoing we have hereunto set our hands at Milwaukee in the county of Milwaukee and State of Wisconsin in the presence of two witnesses.

RAYMOND W. GRIFFITH.
R. G. WENDLAND.

Witnesses:
 GUSTAV KRUEGER,
 EVAN W. PRICE.